(12) United States Patent
Ferlay

(10) Patent No.: US 11,976,473 B2
(45) Date of Patent: May 7, 2024

(54) MULTILAYER STRUCTURE FOR PRODUCING A PRINTED AND LINOLEUM-BASED FLOOR OR WALL COVERING

(71) Applicant: Gerflor, Villeurbanne (FR)

(72) Inventor: Charles Ferlay, Montrottier (FR)

(73) Assignee: Gerflor, Villeurbanne (FR)

( * ) Notice: Subject to any disclaimer, the term of this patent is extended or adjusted under 35 U.S.C. 154(b) by 0 days.

(21) Appl. No.: 17/518,725

(22) Filed: Nov. 4, 2021

(65) Prior Publication Data
US 2022/0136258 A1 May 5, 2022

(30) Foreign Application Priority Data

Nov. 5, 2020 (FR) ...................................... 2011370

(51) Int. Cl.
*B32B 3/10* (2006.01)
*B32B 7/12* (2006.01)
*B32B 27/14* (2006.01)
*E04F 15/10* (2006.01)

(52) U.S. Cl.
CPC .............. *E04F 15/105* (2013.01); *B32B 7/12* (2013.01); *B32B 27/14* (2013.01); *B32B 2307/4023* (2013.01); *B32B 2307/412* (2013.01); *B32B 2307/554* (2013.01); *B32B 2419/04* (2013.01)

(58) Field of Classification Search
None
See application file for complete search history.

(56) References Cited

U.S. PATENT DOCUMENTS

| 2012/0276348 | A1* | 11/2012 | Clausi | ................... | B32B 29/002 |
|---|---|---|---|---|---|
| | | | | | 428/524 |
| 2015/0184334 | A1* | 7/2015 | Ross | ........................ | B32B 9/04 |
| | | | | | 156/60 |
| 2017/0350142 | A1* | 12/2017 | Ferlay | ................... | B32B 27/304 |

FOREIGN PATENT DOCUMENTS

| EP | 2889135 | 7/2015 |
|---|---|---|
| FR | 3082859 | 9/2021 |
| WO | WO 2020/002787 | 1/2020 |

OTHER PUBLICATIONS

Rapport de Recherche Préliminaire et l'Opinion Ecrite [Preliminary Search Report and the Written Opinion] dated Jun. 23, 2021 From the Institut National de la Propriété Industrielle, INPI, République Française Re. Application No. FR 2011370. (6 Pages).

* cited by examiner

*Primary Examiner* — Christopher M Polley

(57) ABSTRACT

The invention relates to a multilayer structure (1) for producing a floor or wall covering comprising a linoleum-based backing layer (2) reinforced by a reinforcing frame (3), a wear layer (4) bonded to the backing layer (2), and a decor printing layer (5) positioned between the wear layer (4) and the backing layer (2).
According to the invention, the wear layer (4) is made of PET, TPU, PP, PETG, or made of ionomer and is transparent at least to visible light.

11 Claims, 3 Drawing Sheets

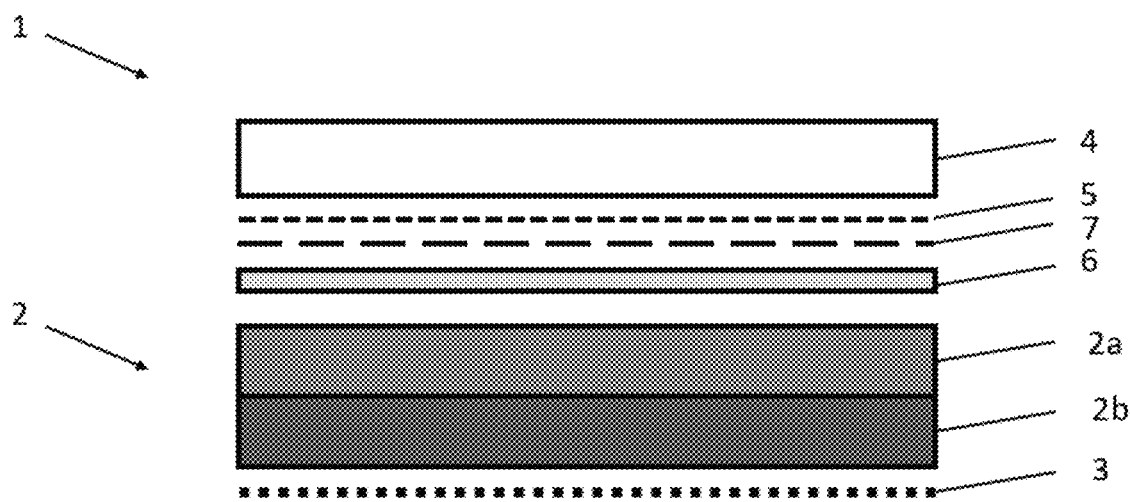
[Fig. 1]
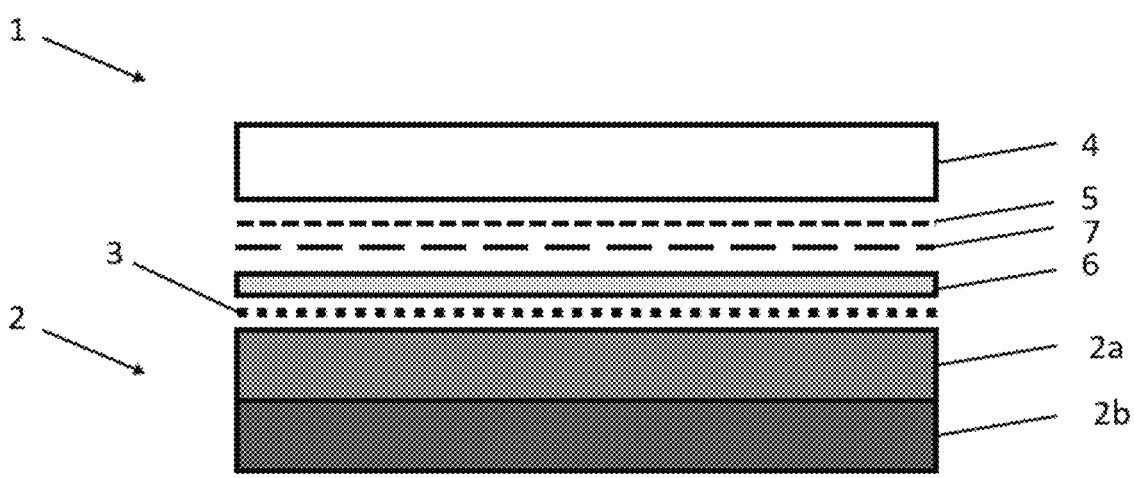
[Fig. 2]
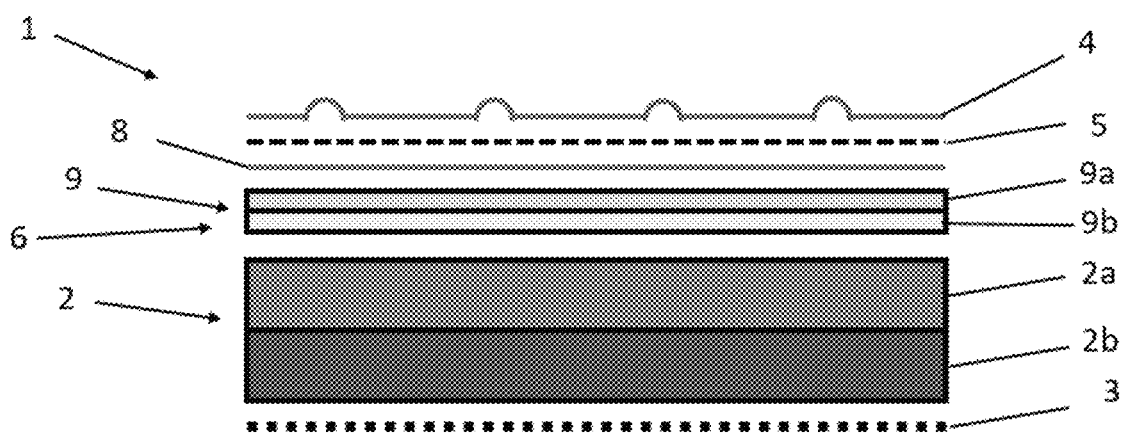
[Fig. 3]

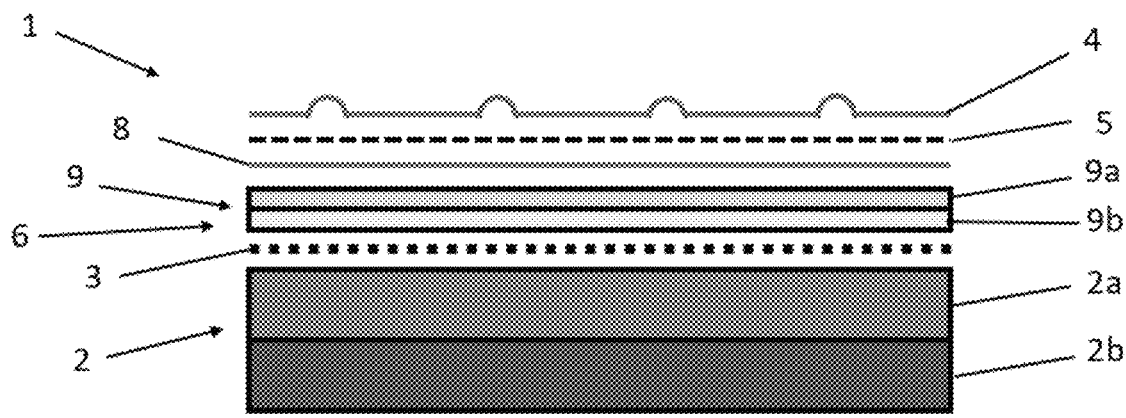
[Fig. 4]
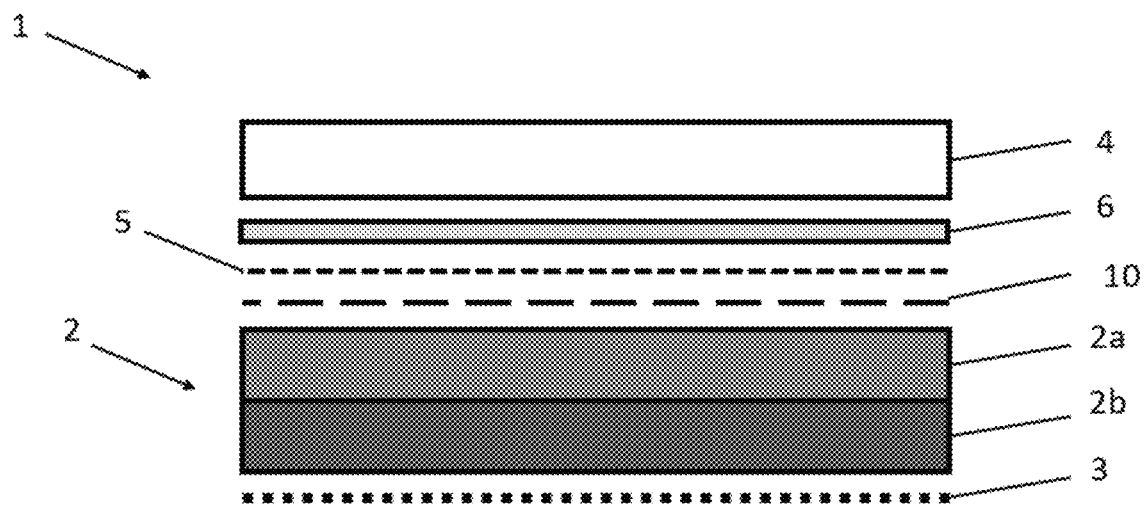
[Fig. 5]

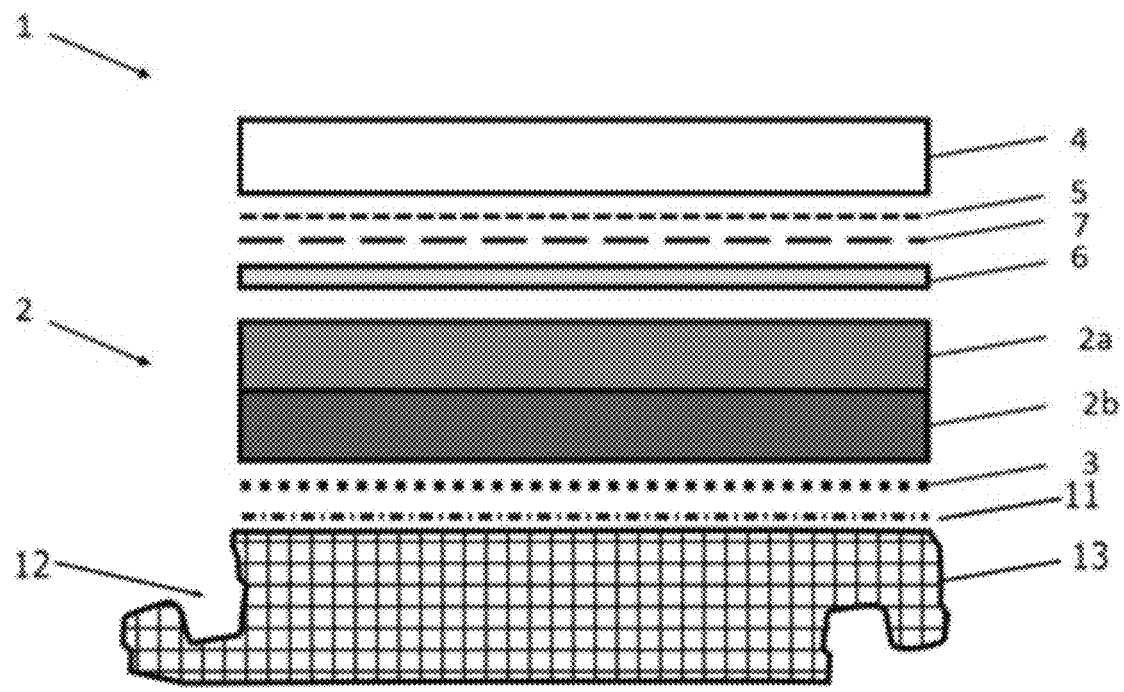
[Fig. 6]
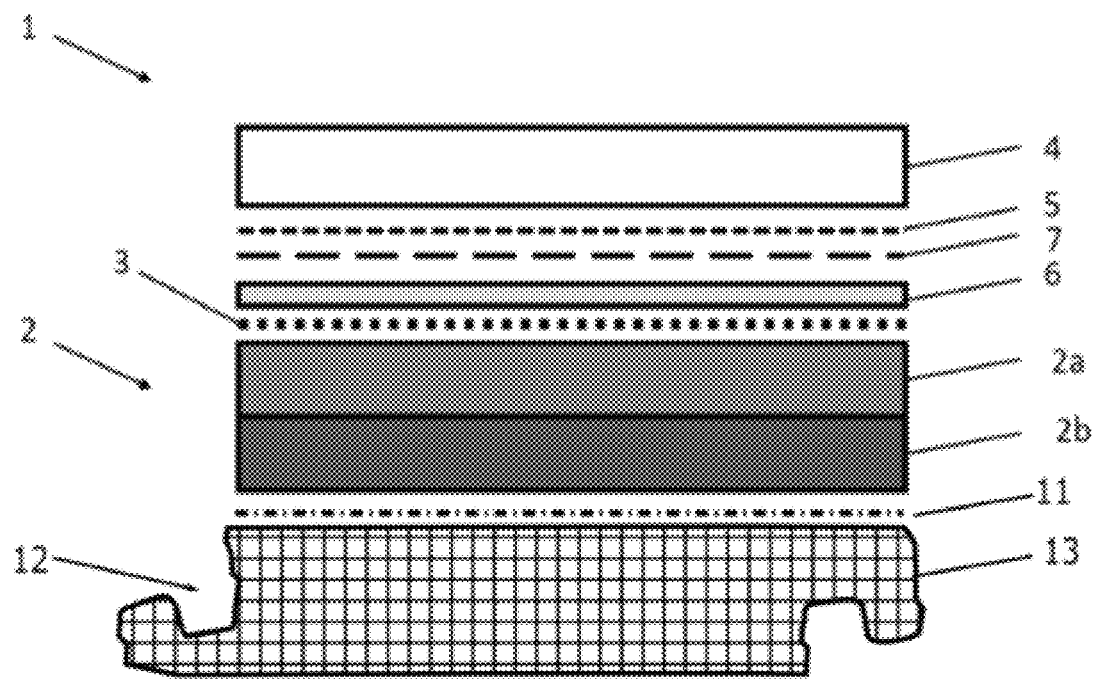
[Fig. 7]

MULTILAYER STRUCTURE FOR PRODUCING A PRINTED AND LINOLEUM-BASED FLOOR OR WALL COVERING

RELATED APPLICATION

This application claims the benefit of priority of France Patent Application No. 2011370 filed on Nov. 5, 2020, the contents of which are incorporated herein by reference in their entirety.

FIELD AND BACKGROUND OF THE INVENTION

The present invention relates to a multilayer structure for producing a floor or wall covering, printed with a decor and linoleum-based.

The present invention has an advantageous application in producing linoleum-based and loose lay floor or wall coverings, for example presented in the form of rolls, tiles or strips.

In the field of the present invention, it is known to produce a multilayer structure for producing a floor or wall covering, having a digitally-printed decor on a linoleum-based backing layer.

For example, a multilayer structure is known, comprising:
- a linoleum-based backing layer which is supported by a reinforcing frame, such as a hessian or a polyester woven mesh, intended to be in contact with the floor or the wall;
- a primary primer layer positioned on the backing layer;
- a decor printing layer, such as a digital printing layer, laid on the primary primer layer;
- a crosslinked polyurethane wear layer positioned on the decor printing layer.

In practice, the linoleum-based backing layer can comprise two layers bonded together, namely a so-called "noble" upper linoleum layer and a recycled lower linoleum layer.

During manufacture, the noble layer and the layer containing recycled linoleum are calandered together on the reinforcing frame before being crosslinked in a furnace at 80° C. for more than 30 days.

The disadvantage of this type of multilayer structure is that the resistance to abrasion of the crosslinked polyurethane wear layer is not sufficient. Indeed, abrasion tests show wear that is too rapid for multilayer structures subjected to average traffic. In particular, the decor disappears after 550 cycles of an abrasion and wear test machine known under the name TABER (trademark) according to standard NF EN 16511+A1.

Document EP 2 723 561 provides for producing this crosslinked polyurethane wear layer by hot sealing and integrating inorganic particles. This type of layer by hot sealing is in particular known to a person skilled in the art as "hotcoating" and is applied preferably with a thickness comprised between 50 and 150 μm, and filled with a filler allowing resistance to abrasion, such as for example an alumina-type filler.

A crosslinked polyurethane wear layer is more resistant when it is obtained from a hot sealing layer. However, this wear layer adds mechanical stresses on the surface of the covering which can lead to a strong curving of it when it is presented in the form of a strip. In addition, this type of wear layer can be brittle if it is subjected to significant impacts.

On the other hand, the method for manufacturing a multilayer structure comprising such a wear layer is long and expensive.

Moreover, according to either of the multilayer structures described above, it is not possible to granulate the wear layer after crosslinking, which makes the products obtained less realistic or more complex to produce.

SUMMARY OF THE INVENTION

One of the aims of the invention is therefore to overcome the abovementioned problems by providing a multilayer structure for producing a linoleum-based floor or wall covering printed with a decor, which has a sufficient resistance in terms of abrasion, i.e. which satisfies the tests of the standard NF EN 16511+A1, while avoiding the curving problems of the covering when it is presented in the form of strips or tiles.

Another aim of the invention is to provide a multilayer structure, preferably with no polyvinyl chloride, and the manufacturing method of which is facilitated and less expensive than that of the prior art.

Another aim of reference is to provide a multilayer structure comprising a more realistic decor than that of the prior art.

To this end, a multilayer structure has been developed for producing a floor or wall covering comprising a linoleum-based backing layer reinforced by a reinforcing frame, a wear layer bonded to the backing layer, and a decor printing layer positioned between the wear layer and the backing layer.

According to the invention, the wear layer is made of polyethylene terephthalate (PET), thermoplastic polyurethane (TPU), preferably aliphatic, polypropylene (PP), or polyethylene terephthalate glycol (PETG), or made of ionomer and is transparent at least to visible light.

In this way, the invention allows to provide a multilayer structure for producing a floor or wall covering, which has a sufficient resistance in terms of abrasion, by satisfying in particular standard NF EN 16511+A1, while decreasing, even by removing the curving problems of the covering when it is presented in the form of a strip and by making the multilayer structure less brittle. The use of such a decor layer also improves the dimensional stability of the multilayer structure.

The method for manufacturing the multilayer structure can also be facilitated and is less expensive, since the decor printing layer can be printed, preferably with a digital printing machine, on a lower face of the wear layer or on an upper face of the backing layer.

Thus, the decor printing layer can be printed separately on a lower face of the wear layer then bonded to the backing layer. This allows to facilitate the method, provides more flexibility and reduces the costs. Indeed, the obtaining of a backing layer is quite long, in particular greater than 30 days, and is done by agitation. It is therefore simpler to separately produce a backing layer and a wear layer having the decor and to bind them tailor-made. The multilayer structure can be manufactured in rolls then cut into strips or into tiles.

Moreover, the wear layer implemented in the multilayer structure according to the invention can be granulated and/or chamfered, thus making the decor more realistic.

According to a particular embodiment, the wear layer is bonded to the backing layer by hot lamination, according to the chemical composition of the two materials to be joined.

According to another embodiment, the wear layer is bonded to the backing layer by way of a bonding layer, possibly transparent at least to visible light, such as a glue layer, for example hotmelt, for example made of copolyester or crosslinked polyurethane, or a hot-melt film, a hot-melt mesh or a hot-melt wall, for example non-woven, of copolyester or copolyamide.

In the case of a bonding layer in the form of a hot-melt film, said hot-melt film can either be single-layer, for example made of ethylene vinyl acetate (EVA), thermoplastic polyurethane (TPU), copolyamide, polyester, copolyester, or two-layer, such as a coextruded film composed of a copolyamide layer and a polyolefin layer.

It is clear that, when a bonding layer is used and that the decor printing layer is printed on the upper face of the backing layer, said bonding layer must be transparent at least to visible light to not hide the decor printing layer.

Advantageously and in order to facilitate the method for manufacturing the multilayer structure according to the invention, the decor printing layer is preferably printed by a digital printing machine and is a water-based ink layer or UV ink, in particular to be crosslinked under ultraviolet.

Preferably, the decor printing layer is positioned, and in particular printed on a white ink layer, which allows to unify the decor, as well as to facilitate the reproducibility of the colors of the decor. In certain cases, in particular if a white ink layer is impossible to print, the backing layer can be covered with a water-based white primer (temperature-drying) or a UV drying white primer before printing of the decor layer. The primer can be of the polyurethane or acrylic type.

According to a particular embodiment, the multilayer structure comprises a support layer made of polypropylene or made of paper impregnated with a binder such as melamine-formaldehyde or urea-formaldehyde resin, disposed between the wear layer and the binding layer.

In this embodiment, the decor printing layer can thus be printed either on the lower face of the wear layer, or directly on an upper face of the support layer made of polypropylene or impregnated paper.

In this embodiment, the bonding layer can be a two-layer hot-melt film comprising a polyolefin upper layer, due to its good affinity with polypropylene, and a lower copolyamide layer, due to its good affinity with linoleum, or a hot-melt layer, for example made of crosslinked polyurethane, due to its good affinity with paper and linoleum.

The reinforcing frame can be disposed on a lower or upper face of the backing layer and is presented for example in the form of a hessian, of a paper-based frame, of a non-woven material or a polyester woven mesh. The interest of positioning the reinforcing frame on an upper face of the backing layer is that this allows to improve the dimensional stability and to limit, even remove the phenomenon of curving of the multilayer structure. According to a variant, the multilayer structure comprises two reinforcing frames, positioned on either side of the backing layer.

Preferably, and with the aim of making the covering more realistic, according to the desired decor, the upper face of the wear layer is chamfered and/or granulated.

In a variant, and in order to propose a loose lay tiled or stripped floor, the backing layer can be bonded, by way of a bonding layer, to a sublayer comprising male-female bonding or assembling means. The bonding layer can be a hot-melt glue layer, or a hot-melt film.

The invention also relates to a method for manufacturing such a multilayer structure, noteworthy in that the decor printing layer is produced by digital printing on a lower face of the wear layer or on an upper face of the backing layer.

BRIEF DESCRIPTION OF THE SEVERAL VIEWS OF THE DRAWINGS

FIG. 1 is a schematic representation of a multilayer structure according to a first variant of the invention.

FIG. 2 is a schematic representation of a multilayer structure according to a second variant of the invention.

FIG. 3 is a schematic representation of a multilayer structure according to a third variant of the invention.

FIG. 4 is a schematic representation of a multilayer structure according to a fourth variant of the invention.

FIG. 5 is a schematic representation of a multilayer structure according to a fifth variant of the invention.

FIG. 6 is a schematic representation of a multilayer structure according to a sixth variant of the invention.

FIG. 7 is a schematic representation of a multilayer structure according to a seventh variant of the invention.

DESCRIPTION OF SPECIFIC EMBODIMENTS OF THE INVENTION

In reference to FIGS. 1 to 7, the invention relates to a multilayer structure (1) for producing a linoleum-based floor or wall covering, with a decor printing layer, preferably obtained by digital printing, with no PVC, which resists the abrasion tests in force, and wherein the phenomena of curving are limited, even avoided.

To this end, the multilayer structure (1) conventionally comprises, a linoleum-based backing layer (2) which could comprise two layers, namely a so-called "noble" upper layer (2a) and a lower layer (2b) containing recycled linoleum. The backing layer (2) has, for example, a thickness comprised between 1.3 and 3 mm and preferably comprised between 1.8 and 2.2 mm. The backing layer (2) is reinforced by a reinforcing frame (3) which can be a hessian, a paper-based frame, a non-woven material or a polyester woven mesh, for example. The noble (2a) and recycled (2b) layers of the backing layer (2) are, for example, calandered together on a reinforcing frame (3) before being crosslinked in a furnace, for example at 80° C. for more than 30 days. The backing layer (2) has, for example, a thickness comprised between 1.5 and 3 mm.

The invention then consists of providing a wear layer (4), transparent to visible light, with no PVC, in particular made of PET, preferably aliphatic TPU, PP, PETG or made of ionomer, and to bond it to the backing layer (2), by positioning beforehand a decor printing layer (5) between the wear layer (4) and the backing layer (2). For example, the decor printing layer (5) has a thickness comprised between 4 and 300 µm and can be printed on a lower face of the wear layer (4) or on an upper layer of the backing layer (2). The wear layer (4) comprises for example, a density comprised between 0.9 and 1.4, and preferably comprised between 1.15 and 1.25 and a thickness comprised between 50 and 600 µm, and preferably comprised between 200 and 500 µm.

Several solutions are possible to bind the wear layer (4) to the linoleum-based backing layer (2). For example, the two layers can be laminated together and hot laminated so as to obtain a fusion of the materials at the interface of the two layers or can be bonded by way of a bonding layer (6), possibly transparent to visible light, such as a hot-melt glue layer, a hot-melt film, a hot-melt mesh or a hot-melt wall, for example a non-woven material, of copolyester or copolyamide.

The hot-melt film comprises for example, an area density of 20 to 300 g/m² and can be single-layer, for example made of EVA, TPU, copolyamide, polyester or copolyester, or a two-layer hot-melt film, for example coextruded, composed of a copolyamide layer and a polyolefin layer.

The hot-melt mesh or hot-melt mesh, for example nonwoven, of copolyester or copolyamide comprises for example an area density of 5 to 100 g/m².

The decor printing layer (5) is preferably printed by a digital printing machine, and perhaps a water-based ink or UV ink layer to crosslink under ultraviolet, printed possibly on a white ink layer (7) in order to harmonize and improve the reproducibility of the colors of the decor.

The wear layer (4) can be varnished to give it good surface properties, in particular shine, resistance to clogging and slipperiness, with a varnish, for example acrylic or polyurethane, of a thickness generally comprised between 7 and 30 μm.

From the concept to the basis of the invention, several embodiments can be considered.

For example, the reference in FIG. 1, a decor printing layer (5) can be printed on a lower face of a wear layer (4) made of PET, TPU, PP, ionomer or PETG.

On top of the decor printing layer (5), a white ink layer (7), of thickness in the range of 5 to 10 μm is then printed, optionally, and preferably also with a digital printing machine.

The wear layer (4) is then returned and bonded, i.e. hot laminated or by way of a bonding layer (6), with a natural linoleum-based backing layer (2), or composed of a so-called "noble" linoleum upper layer (2a) and a recycled linoleum lower layer (2b), supported by a reinforcing frame (3), such as a hessian, a paper-based frame, a non-woven material, or a polyester woven mesh, intended to be in contact with the floor or the wall to be covered.

The bonding layer (6) can be a fastening primer, a hot-melt glue layer, or a hot-melt film.

In a variant, and according to FIG. 2, the reinforcing frame layer (3) can be positioned between the bonding layer (6) and the upper face of the backing layer (2), in order to limit, even remove the phenomenon of curving.

In a variant, and according to FIG. 3, the multilayer structure (1) comprises a support layer (8), for example of thickness comprised between 70 and 150 μm, made of polypropylene or made of paper impregnated with a binder such as melamine-formaldehyde resin or urea-formaldehyde resin, positioned between the wear layer (4) and the bonding layer (6). More specifically, the wear layer (4), the decor printing layer (5) and the support layer (8) form a complex, which complex is bonded to the backing layer (2) by the bonding layer (6). During the manufacture of the complex, the decor printing layer (5) can be printed on the lower face of the wear layer (4) or printed on an upper face of the support layer (8).

For example, the complex can comprise a support layer (8) made of paper impregnated with a decor printing layer (5) then bonded by hot lamination with a wear layer (4) made of polypropylene. The wear layer (4) is then varnished.

In this example, the bonding layer (6) is presented advantageously in the form of a hot-melt glue, for example made of crosslinked polyurethane, the deposition of the glue being preceded by a corona- or plasma-type pretreatment of the surface of the backing layer (2) in order to improve its adherence.

In another example, the complex can comprise a support layer (8) made of polypropylene printed with a decor printing layer (5) then bonded by hot lamination with a wear layer (4) made of polypropylene. The wear layer (4) is then varnished.

In this example, the bonding layer (6) is presented advantageously in the form of a two-layer hot-melt film (9) comprising an upper layer (9a) made of polyolefin, due to its good affinity with polypropylene, and a lower layer (9b) made of copolyamide, due to its good affinity with linoleum of the backing layer (2).

The backing layer (2) is similar to that represented in FIG. 1, with the reinforcing frame (3) positioned on the lower face of the backing layer (2) to be in contact with the floor or the wall to be covered.

In the examples of FIGS. 2 and 3, the decor printing layer (5) can be printed with water-based inks by rotogravure. The wear layer (4), for example a layer obtained from a Surlyn-type ionomer, i.e. made of ethylene copolymer with a vinyl monomer (methacrylic acid), comprises for example a thickness in the range of 300 μm and is granulated. The complex formed by the wear layer (4), the decor printing layer (5) and the support layer (8) comprises a total thickness comprised between 170 μm and 420 μm according to the desired wear classification.

The bonding layer (6), which can in particular be a two-layer hot-melt film (9) made of polyolefin (9a)/copolyamide (9b) has for example, a weight comprised between 24 and 95 g/m² and allows to assemble the complex with the backing layer (2).

In a variant, and in reference to FIG. 4, the reinforcing frame (3) can be positioned between the bonding layer (6) and the backing layer (2) in order to decrease, even remove the phenomenon of curving.

According to another manufacturing variant, illustrated in FIG. 5, the invention consists of printing directly the decor printing layer (5) on an upper layer of the linoleum-based backing layer (2).

The multilayer structure (1) thus comprises, from the floor or the wall to the surface:
- a reinforcing frame (3);
- a linoleum-based backing layer (2);
- a decor printing layer (5) printed on an upper face of the backing layer (2) or possibly on a polyurethane- or acrylic-type fastening primer (10) deposited on the upper face of the backing layer (2);
- a bonding layer (6), in particular transparent to visible light, such as another fastening primer, a hot-melt glue, a hot-melt film;
- a wear layer (4) positioned on the bonding layer (6).

Of course, and as mentioned above, the bonding layer (6) is optional if the wear (4) and reverse (2) layers are laminated together and hot laminated.

In a variant, and in reference to FIGS. 6 and 7, the backing layer (3) can be bonded, by way of a bonding layer (11), to a sublayer (12) comprising male-female bonding or assembling means (13). The bonding layer (11) can be a hot-melt glue layer, or a hot-melt film. The backing layer (2), as well as the layers (3), (4), (5) and (6) are similar to those represented in FIG. 1. Of course, these layers can be replaced by the different layers presented in FIGS. 3 to 5, in order to have a decor layer (5) and a wear layer (4). The multilayer structure (1) is thus presented in the form of tiles or strips which could easily be assembled on the floor or wall to be covered and preferably without glue.

The sublayer (12) can be single-layer or multilayer and made for example from plastic material such as polypropylene, polyurethane, thermoplastic, polyethylene, polyethylene terephthalate, or any other suitable plastic material, and possibly comprising fillers in the form of fibers, shavings, dust or sawdust and/or mineral fillers, for example chalk, limestone, talc, and one or more plasticizers in order to define the sublayer (12). Preferably, the sublayer (12) does not comprise polyvinyl chloride.

The sublayer (12), or one or more layers of the sublayer (12) in the case of a multilayer sublayer (12), can possibly be melamine-formaldehyde or urea-formaldehyde resin- and wood resin-based, for example fiber layers of average density (MDF) or fibers of high density (HDF). Each layer of the sublayer (12) can be a laminated wood layer, composite wood layer (WPC (wood plastic composite)).

The male-female means for bonding or assembling (13) panels are in particular described in documents GB 2 256 023, EP 1 026 341, WO 2012/004701, EP 2 843 153 or also WO 2016/030627.

According to the variant presented in FIG. 6, the reinforcing frame (3) is positioned on the lower face of the backing layer (2) to be in contact with the bonding layer (11).

According to the variant presented in FIG. 7, the reinforcing frame (3) is positioned between the bonding layer (6) and the upper face of the backing layer (2), in order to limit, even remove the phenomenon of curving.

What is claimed is:

1. A multilayer structure for producing a floor or wall covering comprising:
    a wear layer made only of polypropylene (PP) and transparent at least to visible light, and
    a decor printing layer, and
    a support layer consisting of a polypropylene layer,
    bonded together to form a complex, the complex being bonded by a bonding layer to a linoleum-based backing layer reinforced by a reinforcing frame and wherein the bonding layer is a two-layer hot melt film comprised of different material.

2. The multilayer structure according to claim 1, wherein the bonding layer is a single-layer hot-melt film made of EVA, TPU, copolyamide, polyester or copolyester, or a two-layer hot-melt film, or a two-layer hot-melt coextruded film, composed of copolyamide and of polyolefin.

3. The multilayer structure according to claim 1, wherein the decor printing layer is a water-based ink or UV ink layer.

4. The multilayer structure according to claim 1, wherein the decor printing layer is positioned on a white ink layer.

5. The multilayer structure according to claim 1, wherein the reinforcing frame is disposed on a lower and/or upper face of the backing layer.

6. The multilayer structure according to claim 1, wherein the upper face of the wear layer is chamfered and/or granulated.

7. A method for manufacturing a multilayer structure according to claim 1, wherein the decor printing layer is made by digital printing on a lower face of the wear layer or on an upper face of the backing layer.

8. The multilayer structure according to claim 1, wherein the bonding layer is selected from a group consisting of a hot-melt glue layer, a hot-melt film, a hot-melt mesh, a hot-melt wall, a non-woven hot-melt wall, a layer of copolyester and a layer of copolyimide.

9. The multilayer structure according to claim 1, wherein a thickness of the support layer is between 70 µm and 150 µm.

10. The multilayer structure according to claim 1, wherein the bonding layer is made of a polyolefin and a copolyamide bonding layer.

11. A multilayer structure for producing a floor or wall covering comprising:
    a wear layer made of PET, TPU, PP, PETG or made of ionomer, and transparent at least to visible light, and
    a decor printing layer, and
    a support layer consisting of a polypropylene layer bonded together to form a complex, the complex being bonded by a bonding layer to a linoleum-based backing layer reinforced by a reinforcing frame,
    wherein the bonding layer is a two-layer hot-melt film comprising an upper layer made of polyolefin and a lower layer made of copolyamide.

* * * * *